United States Patent
Charny

[11] Patent Number: 5,868,079
[45] Date of Patent: Feb. 9, 1999

[54] STAND FOR A MONITOR AND A KEYBOARD

[75] Inventor: Gad Charny, Ramat Gan, Israel

[73] Assignee: Finish Group Ltd., Kiryat Ata, Israel

[21] Appl. No.: 730,585

[22] Filed: Oct. 16, 1996

[51] Int. Cl.[6] .............................. A47F 5/12; F16M 11/14
[52] U.S. Cl. ......................... 108/7; 108/147; 108/147.2; 108/50.01; 248/123.11; 248/412; 248/162.1; 248/181.2
[58] Field of Search .......................... 108/7, 147, 147.19, 108/147.2, 148, 50.01; 248/123.11, 125.2, 411, 412, 162.1, 181.2, 288.31; 403/148, 146

[56] References Cited

U.S. PATENT DOCUMENTS

| | | | |
|---|---|---|---|
| 2,859,983 | 11/1958 | May | 248/288.31 X |
| 3,362,671 | 1/1968 | Johnson | 403/148 X |
| 3,690,608 | 9/1972 | Poizner . | |
| 4,018,104 | 4/1977 | Bland et al. | 403/146 X |
| 4,135,694 | 1/1979 | Stegenga et al. | 403/146 X |
| 4,365,561 | 12/1982 | Tellier | 108/7 |
| 4,566,741 | 1/1986 | Eriksson et al. | 108/7 X |
| 4,567,835 | 2/1986 | Reese et al. . | |
| 4,605,189 | 8/1986 | Bruneau | 248/162.1 |
| 4,638,969 | 1/1987 | Brown . | |
| 4,779,922 | 10/1988 | Cooper . | |
| 4,815,391 | 3/1989 | Lee . | |
| 5,033,707 | 7/1991 | Sträter et al. . | |
| 5,041,770 | 8/1991 | Seiler et al. . | |
| 5,357,873 | 10/1994 | Hilton | 108/50.01 |
| 5,360,196 | 11/1994 | DiGiulio et al. | 248/123.11 X |
| 5,462,247 | 10/1995 | Aldrich . | |
| 5,483,898 | 1/1996 | Seidl . | |
| 5,490,466 | 2/1996 | Diffrient . | |
| 5,501,420 | 3/1996 | Watt et al. . | |

FOREIGN PATENT DOCUMENTS

| | | | |
|---|---|---|---|
| 29089 | 11/1972 | Australia | 248/412 |
| 3532803 | 3/1987 | Germany | 312/223.1 |

*Primary Examiner*—Peter M. Cuomo
*Assistant Examiner*—Hanh V. Tran
*Attorney, Agent, or Firm*—Mark M. Friedman

[57] ABSTRACT

A stand for a monitor and a keyboard, which can be used to hold a computer monitor and keyboard so that a human operator may comfortably use the computer in a variety of positions, including sitting in a conventional chair and standing. The stand includes two shelves, each of which is attached to a post. The posts are then attached to a base. One shelf is designed to hold a monitor, while the other shelf is designed to hold a keyboard. The keyboard shelf itself is tiltable about its post, such that the angle between the keyboard shelf and its post is adjustable. Both the post attached to the keyboard shelf, and the post attached to the monitor shelf, are independently extensible, such that the length of each post, and hence the vertical position of each shelf, can be adjusted independently. The post attached to the keyboard shelf is also pivotable about the base, such that the angle between the post and the base, as well as the horizontal distance between the keyboard shelf and the monitor shelf, is adjustable.

14 Claims, 15 Drawing Sheets

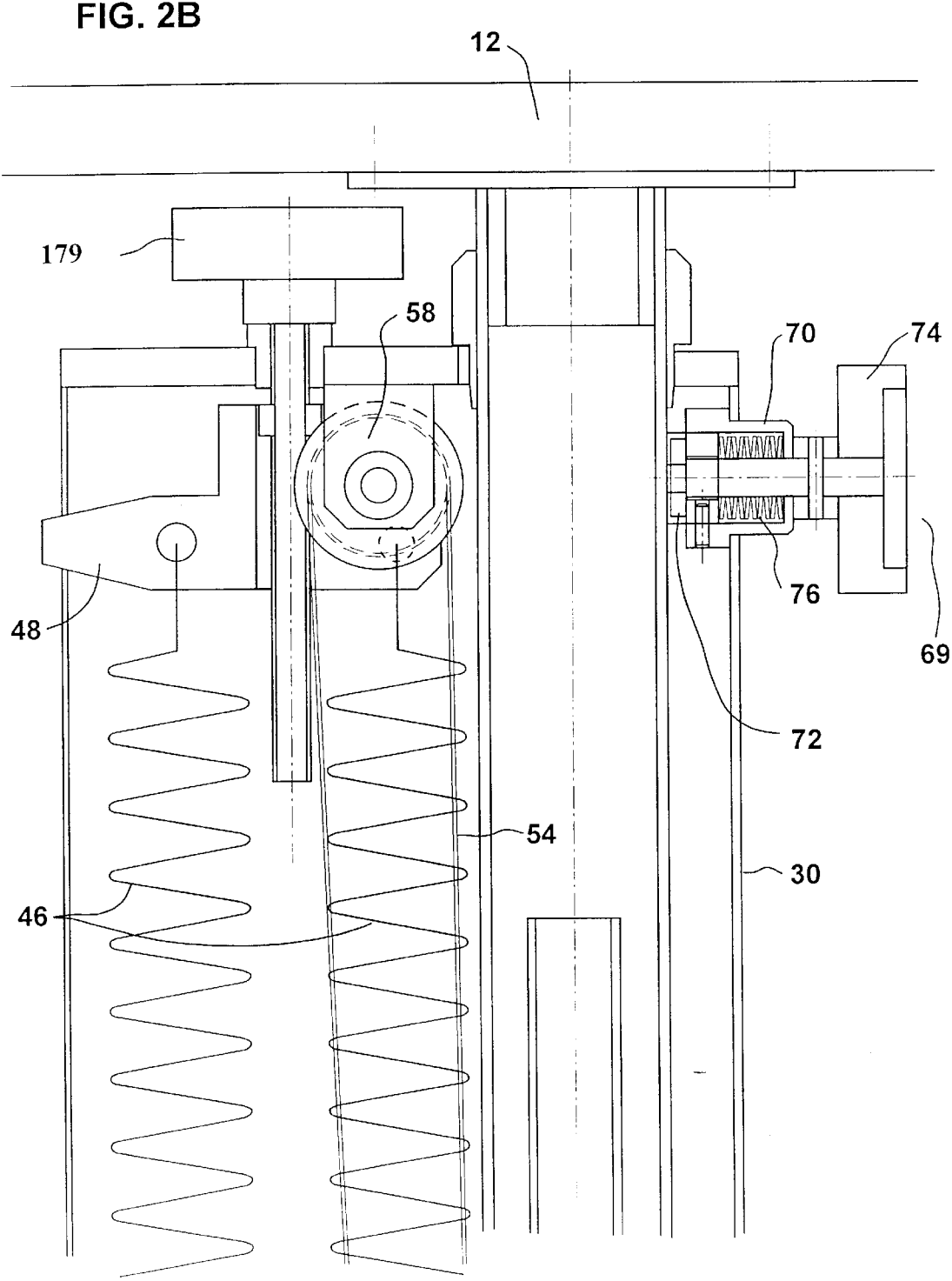

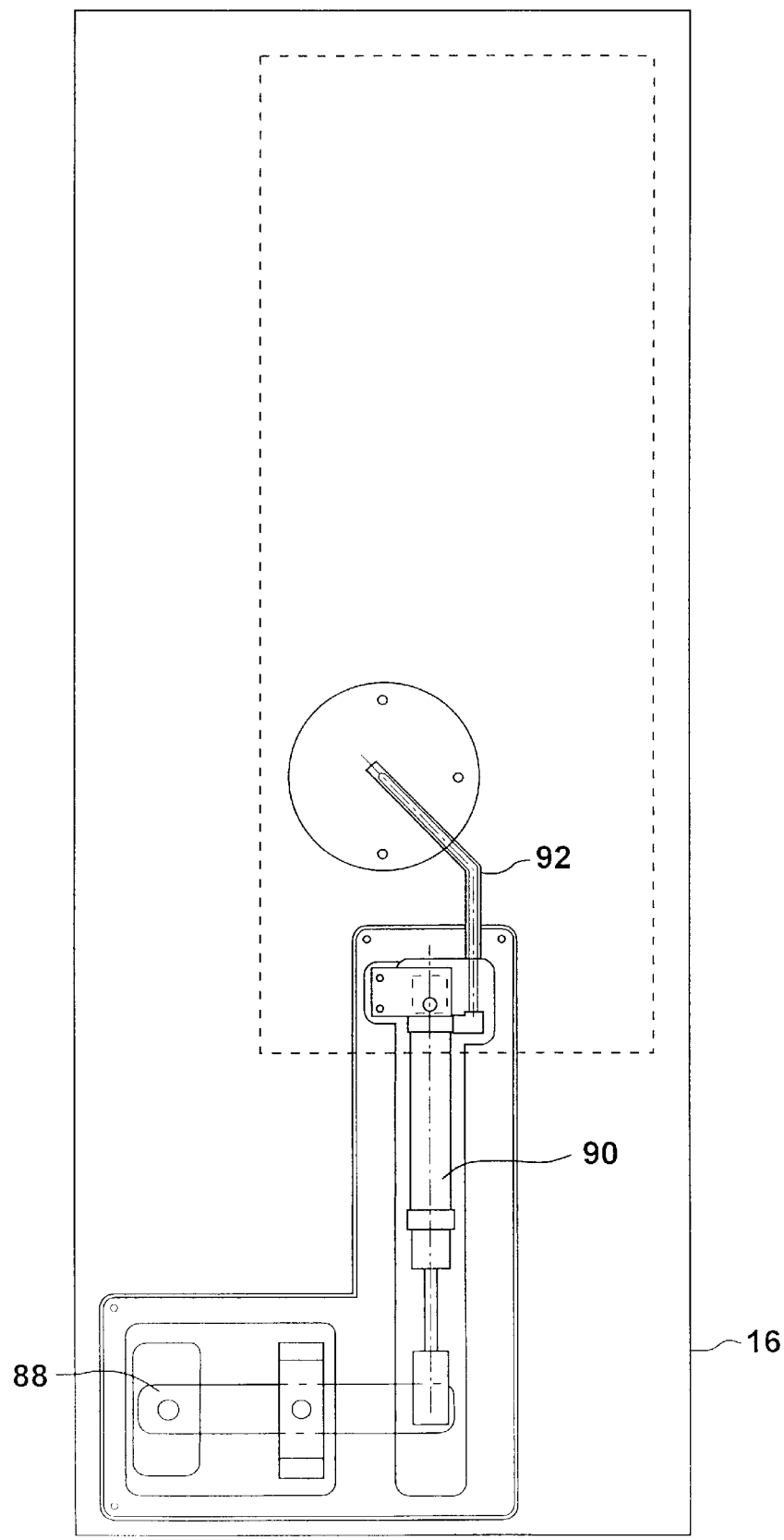

FIG. 3A
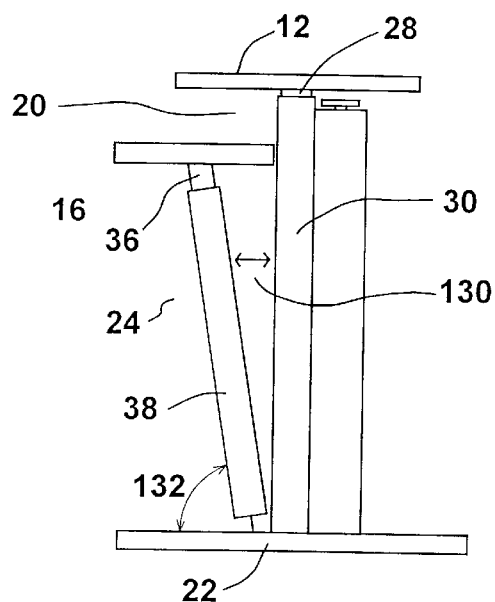
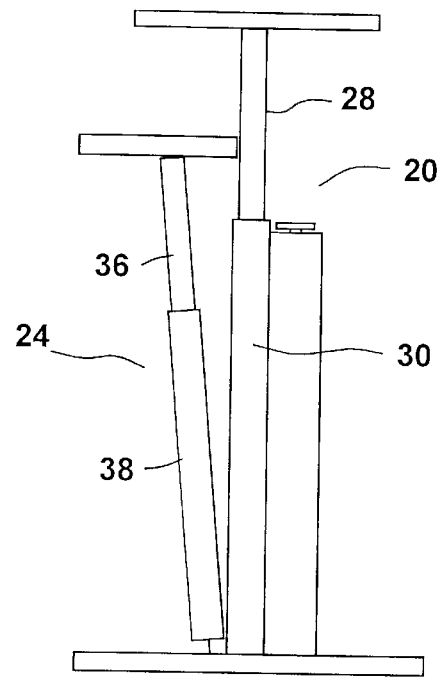
FIG. 3B
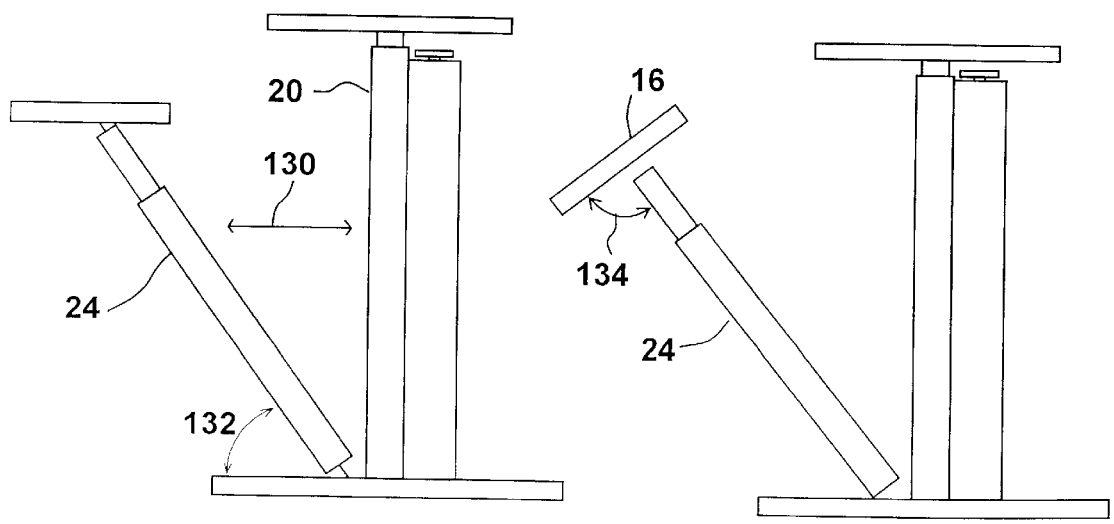
FIG. 3C
FIG. 3D

STAND FOR A MONITOR AND A KEYBOARD

FIELD AND BACKGROUND OF THE INVENTION

The present invention relates to a stand for a computer monitor and a keyboard and, more particularly, to a stand which can be adjusted as necessary for an individual human operator.

A stand for a computer typically includes two shelves for holding the computer monitor and keyboard in a position which allows the operator to sit while using the computer. Hereinafter the term "stand" refers to an assembly for supporting key components of a computer, including a monitor and a keyboard, and optionally including a CPU. These stands can be differentiated from an ordinary desk, in that the monitor shelf is held above the keyboard shelf. This is necessary because the operator must be able to comfortably type on the keyboard while simultaneously looking at the monitor. Thus, the monitor is held at eye level, while the keyboard is held at the level of the operator's hands.

These stands may also include additional shelves, for holding the main body of the computer or a printer, or for holding a telephone, coffee mug and the like. These additional shelves provide a convenient work surface, thereby making the stand a self-contained unit which may be used in place of a conventional desk.

The structure of some of these stands is almost identical to a conventional desk, except that a monitor shelf is provided which is held above the surface of the desk. These stands are inconvenient because the support for the keyboard is not adjustable, since this support is the surface of the desk itself. The inability to adjust the angle of the keyboard can place a significant strain on the operator's wrists. Some stands attempt to alleviate this problem by providing an adjustable section of the desk surface for supporting the keyboard. For example, U.S. Pat. No. 5,483,898 to Seidl (hereinafter referred to as "Seidl") describes a stand with a conventional desk structure, an adjustable section for a keyboard, and a shelf for a monitor which is not adjustable. The keyboard section is tiltable and horizontally slidable, and the support for this section is extensible, which enables the operator to adjust the keyboard section so as to minimize wrist strain. However, the monitor shelf is not adjustable, which may cause the neck of the operator to become strained. Furthermore, the conventional desk structure of the stand of Seidl restricts the range of the adjustments to the keyboard section.

U.S. Pat. No. 5,041,770 to Seiler et al. (hereinafter referred to as "Seiler") discloses a stand with a conventional desk structure, which is an improvement over the stand of Seidl. The vertical position of the monitor shelf and of the keyboard section are both adjustable in the stand of Seiler. The keyboard section is also tiltable. However, the conventional desk structure of the stand of Seiler again restricts the range of adjustments. Thus, the stand cannot be comfortably used while the operator is standing up or sitting on the floor, for example.

Although these stands are clearly more convenient for computer operators than a conventional desk, these stands are still not fully adaptable to the needs of the human operator, largely because these stands still retain a number of characteristics of the conventional desk. However, the conventional desk is not the ideal structure for such a stand, because conventional desks are not adjustable. Computer operators frequently complain of neck strain caused by holding the neck at an uncomfortable angle in order to gaze at the monitor, and of wrist strain from holding the wrists at an uncomfortable angle in order to type on the keyboard. These problems could be alleviated or eliminated if the stand had two independently adjustable shelves, so that the vertical position of each shelf and the degree of tilt of the keyboard shelf could be adjusted to meet the needs of every individual operator.

The stand disclosed in U.S. Pat. No. 4,567,835 to Reese et al. (hereinafter referred to as "Reese") moves away from the conventional desk structure, in that both shelves are attached to separate posts. Both posts are extensible; that is, the length of each post, and hence the vertical position of each shelf, may be independently adjusted. In addition, the monitor shelf is tiltable; that is, the angle of the monitor shelf relative to the post is adjustable. Finally, the keyboard shelf is horizontally slidable, such that the horizontal distance between the keyboard shelf and the monitor shelf is adjustable. However, no provision is made for tilting the keyboard shelf to reduce the strain on the wrists of the operator. Furthermore, in spite of these many adjustments, the stand of Reese is similar to a conventional desk in that the operator must sit in a conventional chair to use this stand.

There is no reason, however, why computer operators should need to sit in a conventional chair in order to use a computer. Conventional chairs themselves may cause back strain and a host of other problems. The computer operator should be able to stand or even sit in a low chair while comfortably using the computer. A conventional desk structure certainly restricts the position of the operator, since it requires the operator to sit in a conventional chair. Such a requirement can be very inconvenient.

Certain stands do not appear to place such restrictions on the position of the operator, yet these stands are also not sufficiently adjustable. For example, neither U.S. Pat. No. 4,638,969 to Brown (hereinafter referred to as "Brown") nor U.S. Pat. No. 4,815,391 to Lee (hereinafter referred to as "Lee") explicitly states the position which the operator must adopt to use the disclosed stands. However, each stand clearly has a number of disadvantages. First, the height of each shelf of Brown cannot be independently adjusted. Thus, if the stand of Brown were adjusted to a height which minimizes neck strain for the operator, the keyboard shelf might be placed at a height which causes wrist strain, and vice versa. Second, the stand of Lee also has a restricted range of adjustments which may be made to the shelves. As the height of the monitor and keyboard shelves is increased, the horizontal distance between the two shelves is decreased. Thus, both the stand of Lee and the stand of Brown restrict the range of adjustments which may be made to the monitor and keyboard shelves, thereby reducing the number of positions in which these stands may be used.

The ability of the operator to sit in a conventional chair, stand, or sit in a chair which is lower to the floor than a conventional chair, while using the computer depends upon the availability of a stand which can adjust to suit each of these positions. Such an adjustment requires more than a simple alteration in the height of the stand. The horizontal and vertical distances between the monitor and the keyboard need to be adjustable, as does the angle between the keyboard and the floor. These separate adjustments are necessary because as the operator moves from sitting in a low chair to sitting in a conventional chair to standing, the distance between the hands and the eyes of the operator also changes. Thus, simply raising the vertical position of the monitor and keyboard is not enough to allow an operator to comfortably use the computer in such a variety of positions.

The horizontal and vertical distances between the monitor and the keyboard must also be adjusted to match the relative position of the operator's eyes and hands. Thus, the overall distance between the operator and the monitor and keyboard must be adjustable.

There is thus a widely recognized need for, and it would be highly advantageous to have, a stand for a monitor and a keyboard which permits a variety of independent adjustments to the position of the monitor and the keyboard, so that the operator may comfortably adopt a variety of positions while using the computer.

SUMMARY OF THE INVENTION

According to the present invention there is provided a stand for a monitor and a keyboard, including: (a) a base; (b) a first substantially vertically oriented post, the first post being extensible, and the first post being attached to the base; (c) a first shelf for holding the monitor, the first shelf being attached to the first post; (d) a second post, the second post being, extensible, the second post being attached to the base and the second post being pivotable about the base; and (e) a second shelf for holding the keyboard, the second shelf being attached to the second post and the second shelf being tiltable about the second post.

According to further features in preferred embodiments of the invention described below, the first post further includes a rod and a sleeve dimensioned to receive the rod, the sleeve being slidable over the rod, such that the first post is extensible. Preferably, the second post further includes a rod and a sleeve dimensioned to receive the rod, the rod being slidable within the sleeve, such that the second post is extensible.

The present invention successfully addresses the shortcomings of the presently known configurations by providing a stand for a monitor and a keyboard which allows the computer operator to comfortably use the stand in a variety of positions. The stand includes a shelf for the monitor and a shelf for the keyboard, each of which is attached to a post. The term "attached" is hereinafter defined as integrally formed with, or connected to. Both posts are attached to a base and both posts are independently extensible. The term "extensible" is hereinafter defined as enabling the length of the post, and hence the height of the attached shelf, to be adjustable. The post attached to the keyboard shelf is also pivotable about the base. The term "pivotable" is hereinafter defined as enabling the angle between the post and the base, as well as the horizontal distance between the monitor shelf and the keyboard shelf, to be adjustable. Finally, the keyboard shelf is tiltable. The term "tiltable" is hereinafter defined as enabling the angle between the shelf and the base to be adjustable. These adjustments allow the operator to adopt a variety of positions, including standing, sitting in a conventional chair, and even sitting in a low chair.

BRIEF DESCRIPTION OF THE DRAWINGS

The invention is herein described, by way of example only, with reference to the accompanying drawings, wherein:

FIG. 1B also showing a monitor, a keyboard and various accessories supported by the stand;

FIGS. 2A–2G illustrate the adjustment mechanism of the stand of FIG. 1;

FIGS. 3A–3D shows four illustrative adjustments which can be made to the stand of FIG. 1;

DESCRIPTION OF THE PREFERRED EMBODIMENTS

The present invention is of a stand for a monitor and a keyboard. Specifically, a stand according to the present invention can be used to hold a computer monitor and keyboard so that a human operator may comfortably adopt a variety of positions, including sitting in a conventional chair and standing. The stand includes two shelves, each of which is attached to a post. The posts are attached to a base. One shelf is designed to hold a monitor, while the other shelf is designed to hold a keyboard. The keyboard shelf itself is tiltable about its post, such that the angle between the keyboard shelf and the post is adjustable. Both the post attached to the keyboard shelf, and the post attached to the monitor shelf, are independently extensible, such that the length of each post, and hence the vertical position of each shelf, can be adjusted independently. The post for the monitor shelf is substantially vertically oriented. The post attached to the keyboard shelf is also pivotable about the base, such that the angle between the post and the base as well as the horizontal distance between the keyboard shelf and the monitor shelf are adjustable.

The present invention preferably includes a third substantially vertically oriented post attached to the base. A first auxiliary shelf is preferably attached to the third post by a first substantially horizontally oriented arm. Optionally, a second auxiliary shelf is attached to the third post by a second substantially horizontally oriented arm. The second auxiliary shelf is also supported by two wheels, and the second arm is preferably pivotable about the third post. Also optionally, a third auxiliary shelf for supporting a computer CPU (central processing unit) or a printer is directly attached to the third post.

The principles and operation of a stand for a monitor and a keyboard according to the present invention may be better understood with reference to the drawings and the accompanying description.

Figure 1A:
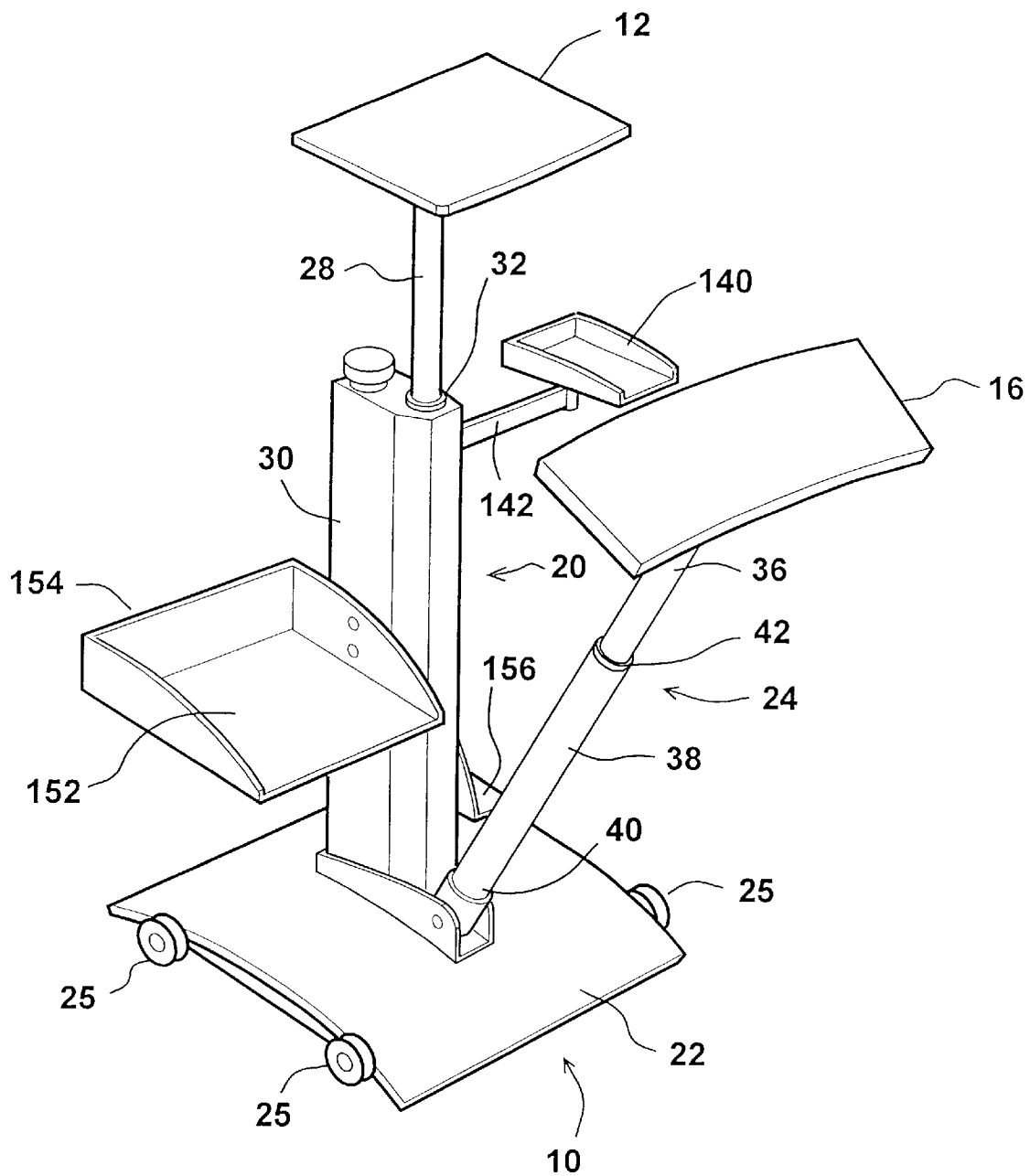
FIGS. 1A and 1B show an illustrative stand for a monitor and a keyboard according to the present invention.
Figure 1B:
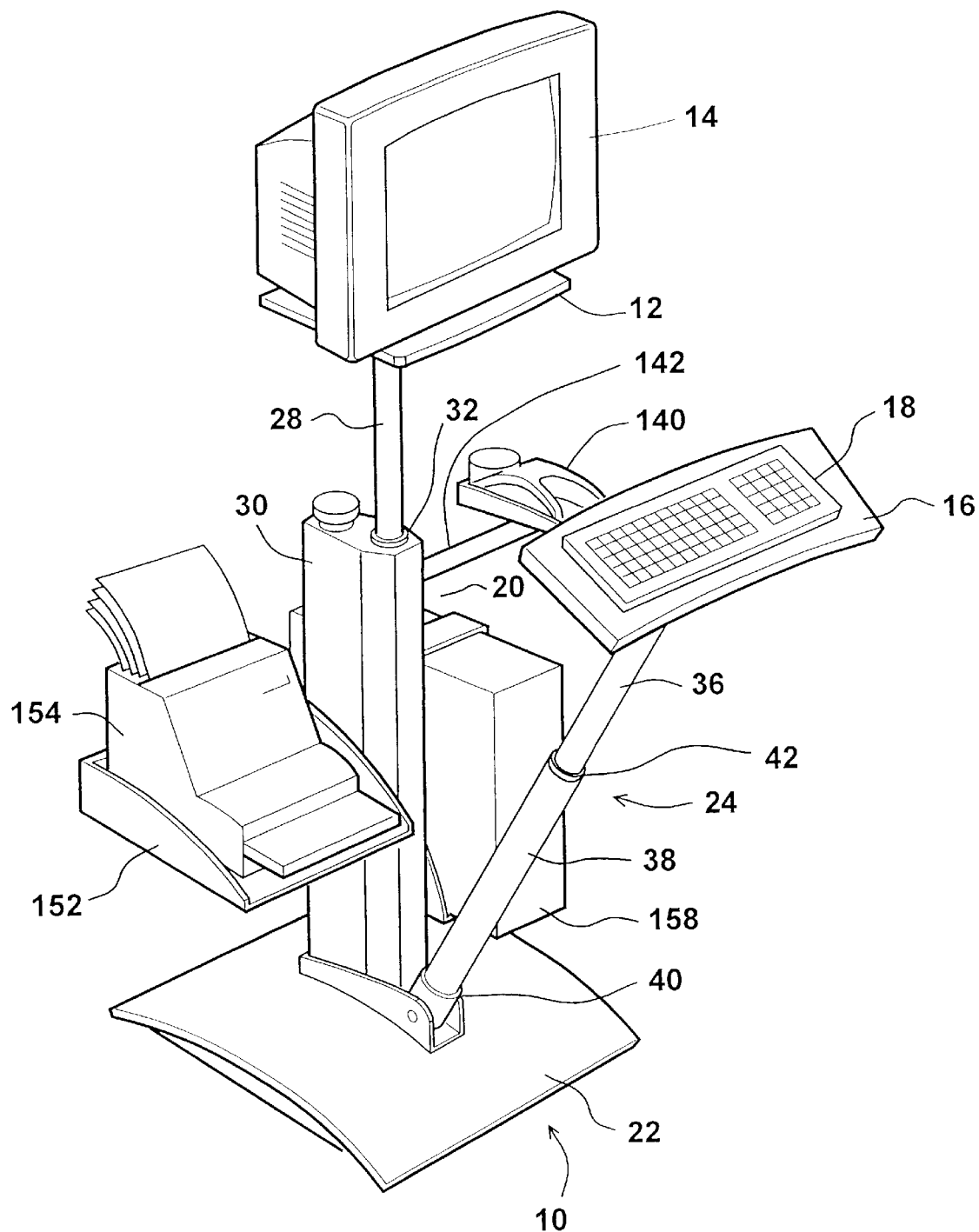

Referring now to the drawings, FIGS. 1A and 1B show an illustrative stand for a monitor and a keyboard, according to the present invention. FIG. 1A shows the stand without a monitor, a keyboard and various accessories placed on the shelves. FIG. 1B shows the stand with these objects on the shelves. A stand 10 includes a monitor shelf 12 for supporting a monitor 14, and a keyboard shelf 16 for supporting a keyboard 18. Monitor shelf 12 is attached to a first substantially vertically oriented post 20, which is attached to a base 22. Keyboard shelf 16 is attached to a second post 24, which is also attached to base 22. Both first post 20 and second post 24 are extensible. Optionally, base 22 can include at least two, and preferably four, wheels 25 which are attached to base 22 for rolling stand 10, as shown in FIG. 1A.

Figure 2A:
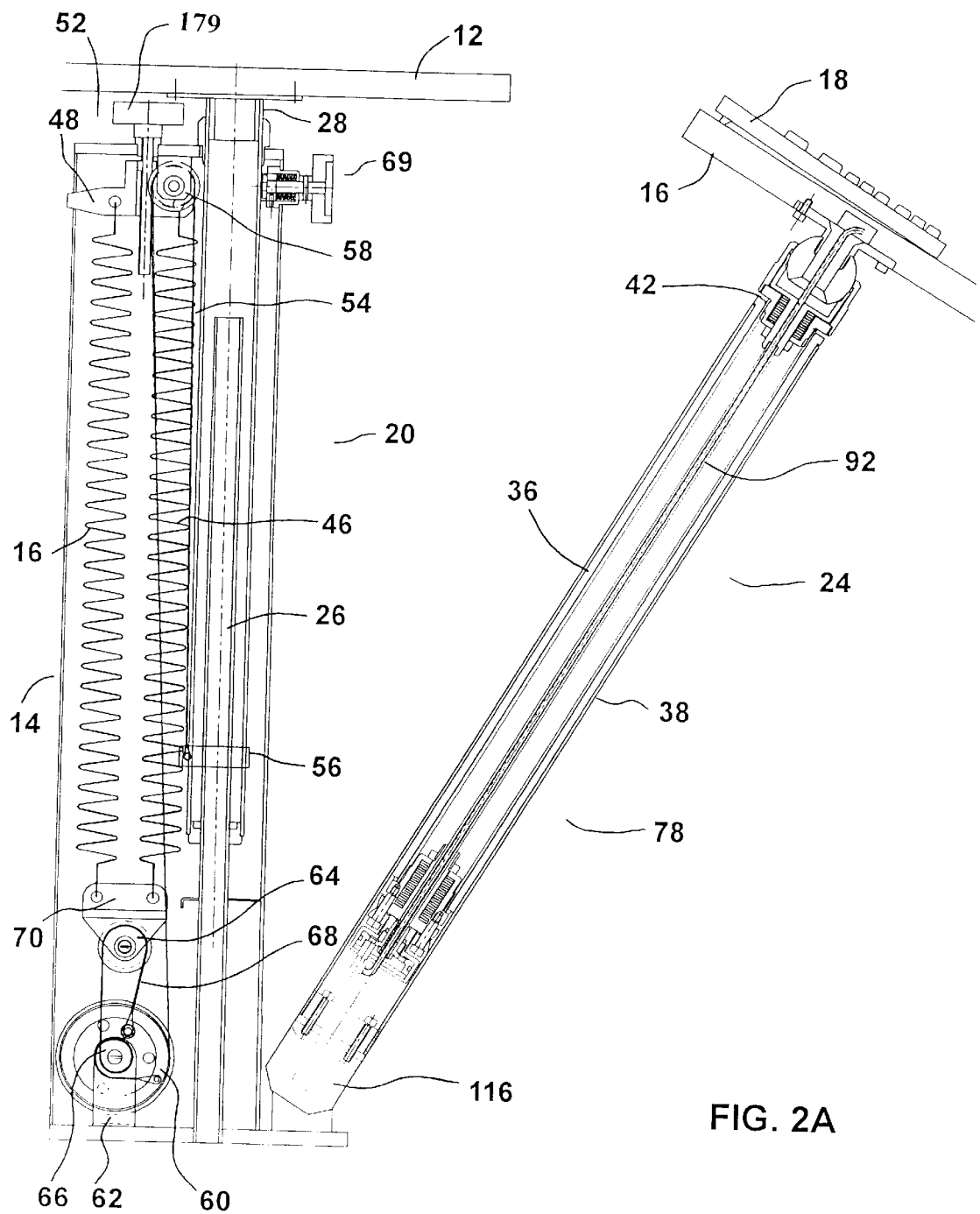

The preferred mechanism for adjusting first post 20 and second post 24 is shown in FIGS. 1A and 1B, and in FIG. 2A. Preferably, first post 20 has a rod 26 (see FIG. 2A), a sleeve 28 and a substantially vertically oriented cover 30. One end 32 of cover 30 is attached to base 22. Both rod 26 and sleeve 28 are disposed within cover 30, but rod 26 is attached to base 22. One end 34 of sleeve 28 is formed to receive rod 26, such that sleeve 28 is able to slide over rod 26, thereby adjusting the length of first post 20, and hence the vertical position of monitor shelf 12 (see FIGS. 2A–2C). Preferably, the maximum length of first post 20 is about 1115 mm, and the minimum length is about 800 mm.

Preferably, second post 24 has a rod 36 and a sleeve 38. A first end 40 of sleeve 38 is attached to base 22. A second end 4 :2 of sleeve 38 is formed to receive rod 36. Unlike first post 20, the length of second post 24, and hence the axial position of keyboard shelf 16, may be adjusted by sliding rod 36 into sleeve 38 (see FIGS. 2A, 2D and 2E). Keyboard shelf 16 is also tiltable about second post 24, as shown in FIG. 2F below. Finally, second post 24 is also pivotable about base 22, by a mechanism described in FIG. 2G below. Preferably, the maximum length of second post 24 is about 900 mm, and the minimum length is about 660 mm.

FIGS. 2A–2G shows cut-away views of first post 20 and second post 24, with their respective preferred adjustment mechanisms. FIG. 2A shows a cut-away view of both first and second posts 20 and 24, while FIGS. 2B–2G are magnifications of portions of FIG. 2A.

Figure 2C:
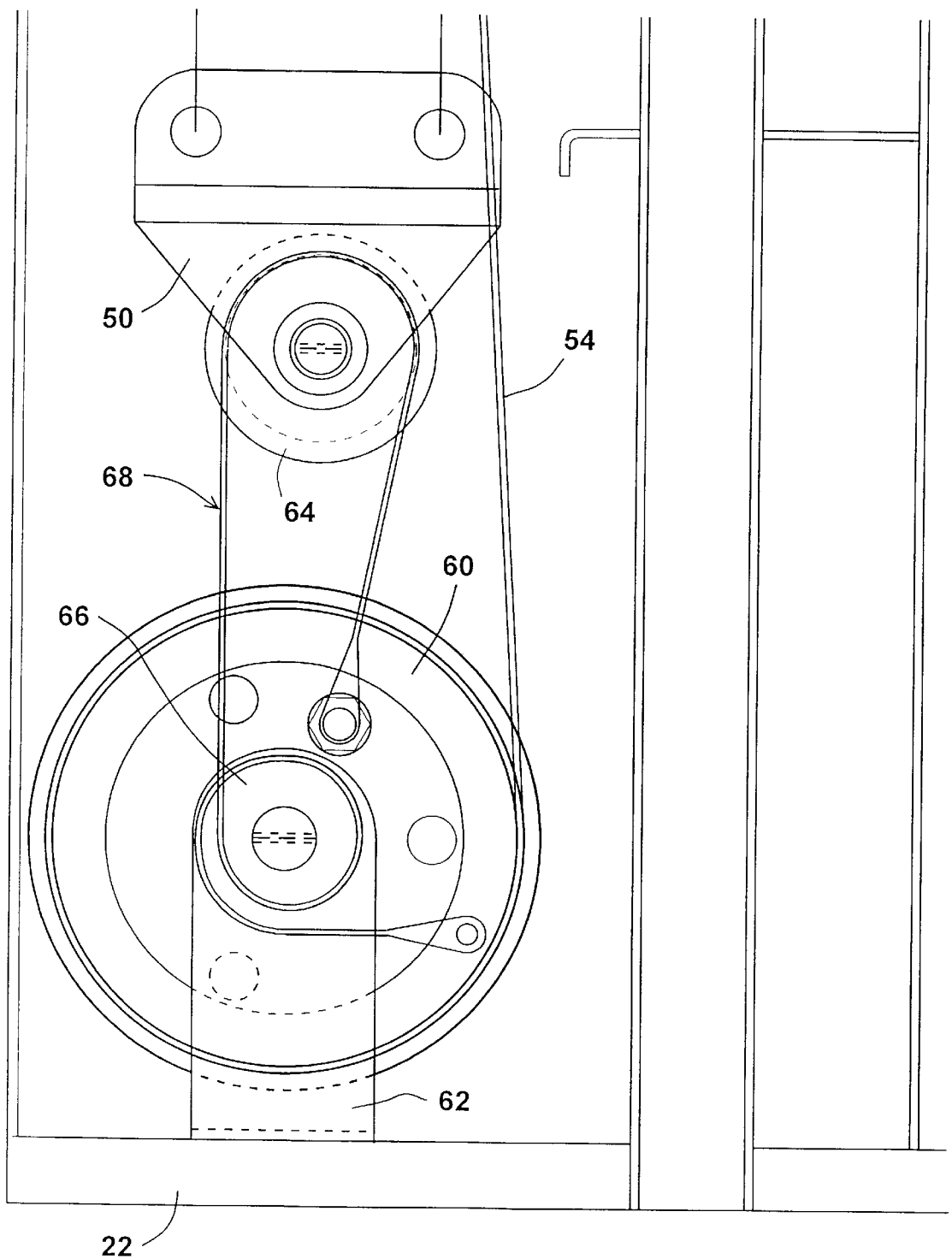

The adjustment mechanism of first post 20 is shown in FIGS. 2A–2C. As noted above, sleeve 28 can slide over rod 26 of first post 20, thereby adjusting the vertical position of monitor shelf 12. However, monitor 14 (not shown) is relatively heavy, typically 10–25 kg, so that it is difficult to both permit sufficient adjustments to sleeve 28 relative to rod 26, and to hold monitor shelf 12 in the desired vertical position once these adjustments have been made. Therefore, a counterbalance assembly 44 is required. Counterbalance assembly 44 is housed within cover 30. Counterbalance assembly 44 has at least one, and preferably two springs 46, each of which is attached at one end to a first spring bracket 48, and at the opposing end to a second spring bracket 50. The force exerted by springs 46 acts as a counterbalance to the weight of monitor 14 (not shown), so that sleeve 28 is held substantially immobile over rod 26 by a pulley assembly 52.

Pulley assembly 52 has a first cable 54, which is attached at one end to a cable holder 56. Cable holder 56 is attached to sleeve 28. First cable 54 is engaged by a first pulley 58, which is attached to first spring bracket 48. First cable 54 is then engaged by a second pulley 60, which is attached to a pulley stand 62. Pulley stand 62 is attached substantially to base 22. First cable 54 transfers the force from springs 46 to sleeve 28, thereby supporting sleeve 28 and maintaining the position of sleeve 28 relative to rod 26. However, a further mechanism is needed to ensure that the force delivered by springs 46 is constant. Otherwise, as the length of springs 46 is altered, as for example if the vertical position of monitor shelf 16 is adjusted, the amount of force delivered by springs 46 will change, so that sleeve 28 may move over rod 26. Thus, a third pulley 64, a fourth pulley 66 and a second cable 68, of pulley assembly 52 are needed so that the force delivered by springs 46 is constant. Second cable 68 is attached at one end to second pulley 60, and at the other end to pulley stand 62 by a connector (not shown). Second cable 68 is engaged by third pulley 64, which is attached to second spring bracket 50. Second cable 68 is then engaged by fourth pulley 66, which is attached to second pulley 60. Fourth pulley 66 is characterized by having a changing radius. Thus, if the length of springs 46 changes, second pulley 60 begins to rotate, potentially changing the force on first cable 54 and thereby changing the position of sleeve 28 relative to rod 26. However, this is counteracted by fourth pulley 66, which changes radius, maintaining force on second cable 68 and thereby keeping the force exerted by springs 46 constant.

Optionally, sleeve 28 is also held substantially immobile relative to cover 30 by a tightener assembly 69 (see also FIG. 2B). Tightener assembly 69 includes a casing 70 which is attached to cover 30, and a shaft 72 which is held against sleeve 28, preventing sleeve 28 from freely sliding over rod 26. Tightener assembly 69 may be adjusted by turning a knob 74. As knob 74 is turned, a spring 76 is either elongated or compressed. Preferably, spring 76 is a leaf spring. The force exerted by spring 76 holds shaft 72 against sleeve 28, providing a further degree of adjustment for the weight of monitor 14 (not shown).

Counterbalance assembly 44 and tightener assembly 69 are used in the following manner. If, for example, a monitor 14 (not shown) is to be placed on monitor shelf 12, counterbalance assembly 44 and tightener assembly 69 must be adjusted to accommodate the weight of monitor 14 (not shown). A handle 179 of counterbalance assembly 44, which is attached to first spring bracket 48, must be turned, changing the amount of force exerted by springs 46 on first cable 54. By turning handle 179, the amount of force exerted by springs 46 is adjusted, so that sleeve 28 is held in a substantially constant position relative to rod 26. This keeps monitor shelf 12 in a substantially constant vertical position. Optionally, tightener assembly 69 may be used, in addition to counterbalance assembly 44, in order to make sufficient adjustments for the weight of monitor 14 (not shown). Although counterbalance assembly 44 alone can be adjusted to support the weight of monitor 14 (not shown), a finer degree of adjustment is made possible by tightener assembly 69, so that it is easier to adjust for the weight of monitor 14 (not shown).

If the position of monitor shelf 12 is to be raised or lowered, the position of sleeve 28 relative to rod 26 must be altered. Monitor shelf 12 is grasped, and monitor shelf 12 is raised or lowered to the desired vertical position. Once the desired vertical position has been achieved, monitor shelf 12 is released, and counterbalance assembly 44 holds sleeve 28 in a substantially constant position relative to rod 26.

Figure 2D:
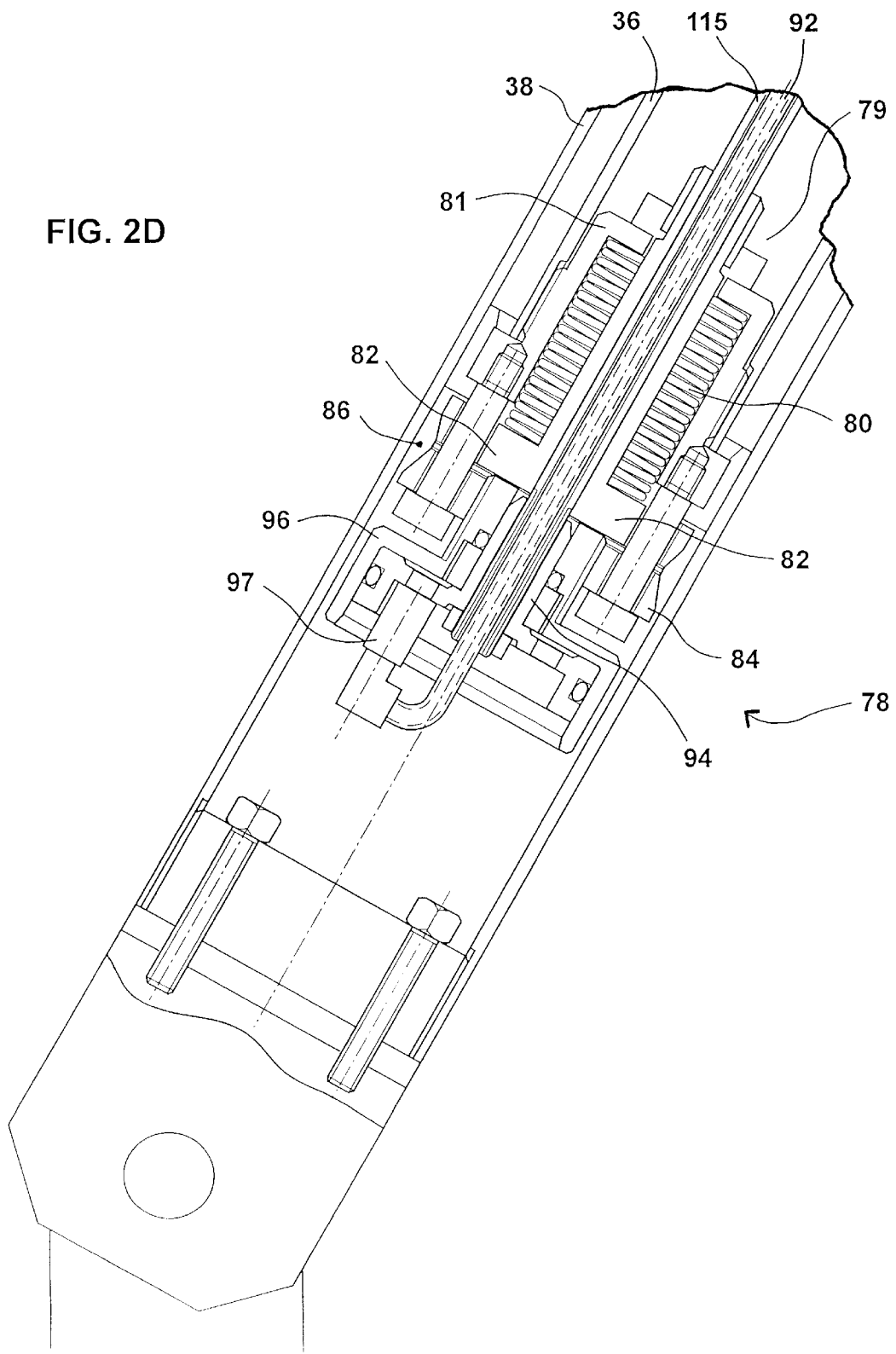
Figure 2F:
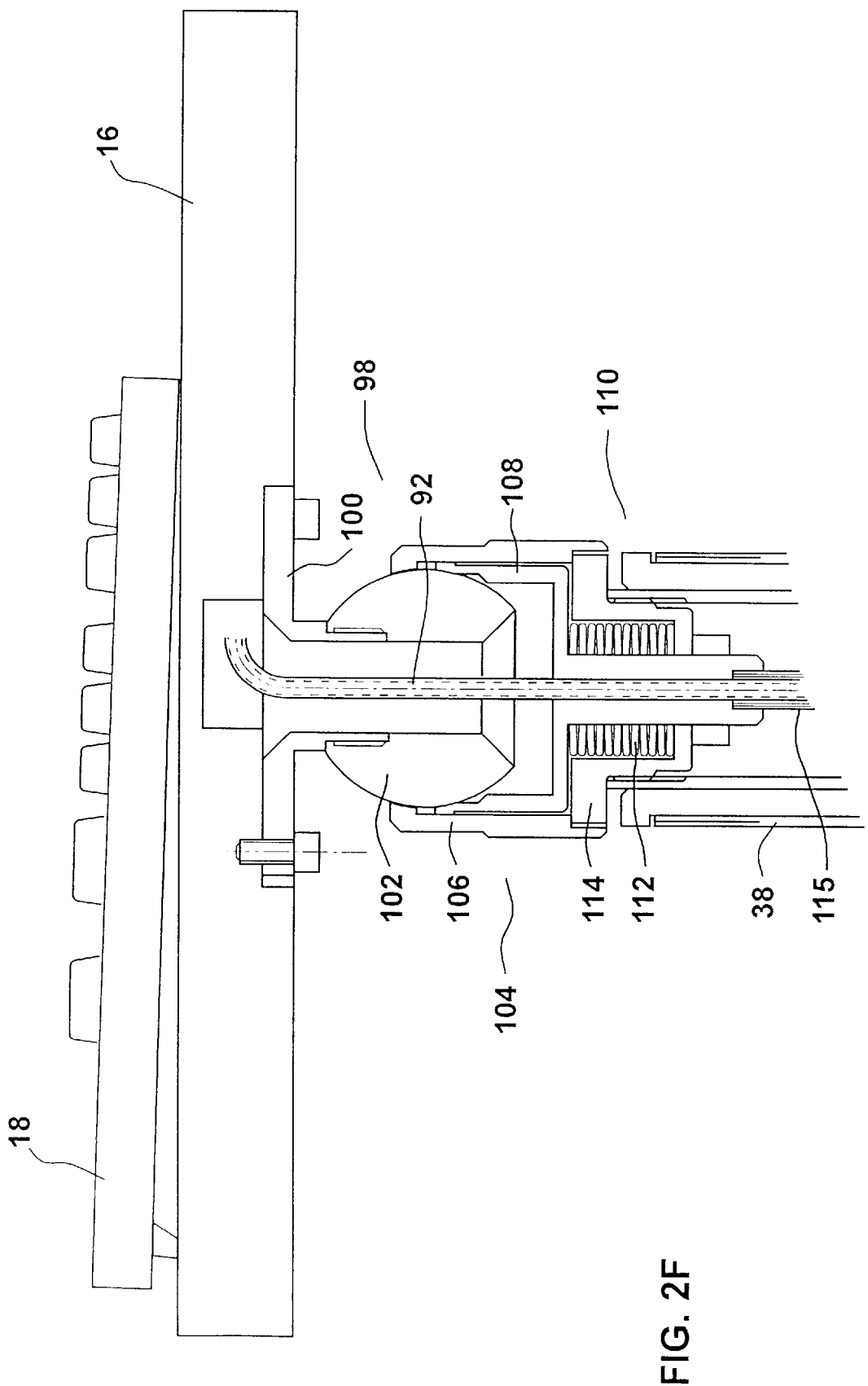

Second post 24 has a different mechanism for adjustment, as shown in FIGS. 2A, 2D and 2E. Within sleeve 38 of second post 24 is an axial adjustment assembly 78. The bottom part of rod 36 rests against axial adjustment assembly 78, such that the position of rod 36 relative to sleeve 38 is determined by axial adjustment assembly 78. Axial adjustment assembly 78 includes a spring assembly 79. Spring assembly includes a spring 80, preferably a leaf spring, and a spring casing 81. Spring 80 is attached at one end to spring casing 81. Spring 80 is attached at another end to, and exerts force against, two L-shaped wedges 82. Each L-shaped wedge 82 pushes against a ring holder 84, which in turn pushes against an abutment member 86, which is preferably an annular ring, causing abutment member 86 to expand. Abutment member 86 abuts the inner surface of sleeve 38. Thus, the force exerted by spring 80 pushes abutment member 86 against the inner surface of sleeve 38, holding axial adjustment assembly 78 immobile against sleeve 38, and thereby holding rod 36 substantially immobile within sleeve 38.

In order to move rod 36 within sleeve 38, a lever 88 on the underside of keyboard shelf 16 must be moved (see FIG. 2E). The movement of lever 88 causes a piston 90 to pump oil into a tube 92. Tube 92 runs from underside of keyboard shelf 16 to a second piston 94. As oil is pumped into tube 92, second piston 94 moves down. The downward movement of second piston 94 pushes a cylinder 96 upward via a connector 97, thereby adjusting the axial position of cylinder 96. The upward movement of cylinder 96 compresses spring 80 of axial adjustment assembly 78, so that L-shaped wedge 82 no longer presses against ring holder 84. Ring holder 84 then ceases to press against abutment member 86, so abutment member 86 contracts and no longer abuts inner surface of sleeve 38. Rod 36 is now freely movable within sleeve 38. After rod 36 has been moved to the desired position relative to sleeve 38, so that keyboard shelf 16 is in the desired axial position, lever 88 on underside of keyboard shelf 16 is released. Now the oil leaves piston 94 and returns to piston 90. Piston 94 no longer pushes cylinder 96 upward, so cylinder 94 returns to its former position. As cylinder 94 returns to its former position, spring 80 relaxes. The relaxation of spring 80 exerts force against L-shaped wedge 82 and ring holder 84, so that abutment member 86 expands and abuts the inner surface of sleeve 38, holding rod 36 substantially immobile within sleeve 38.

Additionally, keyboard shelf 16 is tiltable about second post 24, by a universal joint 98, as shown in FIG. 2F. Universal joint 98 includes a sphere clamp 100 which attaches keyboard shelf 16 to a sphere 102. Sphere 102 is rotatable within a sphere seat 104, which includes two rings 106 and 108. Upper ring 106 is located substantially near the upper pole of sphere 102, closest to sphere clamp 100, and a lower ring 108 which is closer to the lower pole of sphere 102. A spring assembly 110 propels tower ring 108 toward upper ring 106, preventing sphere 102 from rotating. Spring assembly 110 includes a spring 112, within a spring casing 114. A portion of spring 112 abuts lower ring 108. Most preferably, spring 112 is a leaf spring.

In order to tilt keyboard shelf 16, lever 88 on the underside of keyboard shelf 16 must be moved. As noted above, the movement of lever 88 causes piston 90 to pump oil into tube 92. Tube 92 runs from underside of keyboard shelf 16 to second piston 94. As oil is pumped into tube 92, second piston 94 moves downward, causing a hollow rod 115 to move downward. Hollow rod 115 is attached at one end to second piston 94 and at the other end to lower ring 108. The downward movement of hollow rod 115 pulls lower ring 108 from upper ring 106, compressing spring 112. Now sphere 102 is able to rotate within sphere seat 104, so that keyboard shelf 16 may be tilted to the desired position. After lever 88 is released, as noted above second piston 94 returns to its original position. Spring 112 relaxes to its original position, and lower ring 108 is pushed toward upper ring 106, so that sphere 102 is no longer rotatable within sphere seat 104. Keyboard shelf 16 is now held substantially immobile.

Figure 2G:
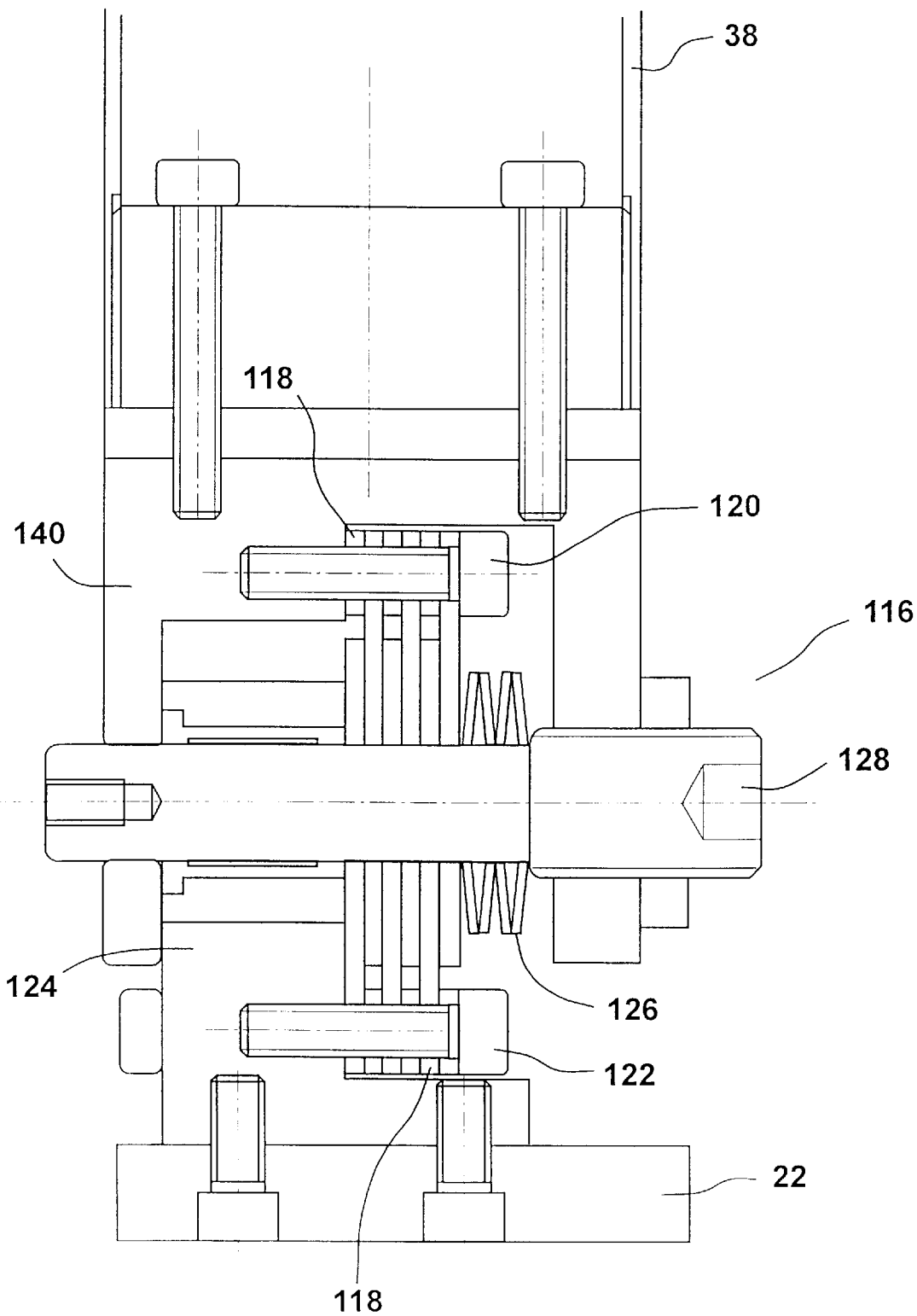

Second post 24 is also pivotable about base 22, by a mechanism shown in FIG. 2G. End 40 of sleeve 38 is attached to base 22 by a friction joint 116, which enables second post 24 to be moved alternately towards first post 20 and away from first post 20, such that the angle between second post 24 and base 22 is adjustable (not shown, see FIG. 2A and FIGS. 3A–3D). Friction joint 116 includes a plurality of friction plates 118. At least one, and preferably three friction plates 118 are attached to a first screw 120. Screw 120 is attached to end 40 of sleeve 38. At least one other, and preferably three other friction plates 118, are attached to a second screw 122. Screw 122 is attached to a projection 124 of base 22. A spring 126 is arranged around an axle 128. Spring 126 pushes friction plates 118 together, preventing end 40 of sleeve 38 from pivoting about axle 128. In order to pivot sleeve 38, and by extension second post 24, about base 22, the operator (not shown) pulls or pushes second post 24, or alternatively keyboard shelf 16, toward, or away from, first post 20. The force exerted by the operator (not shown) overcomes the friction caused by spring 126 pushing friction plates 118 together, so that sleeve 38 pivots about axle 128. After second post 24 has been placed in the desired position, the operator (not shown) stops exerting force against second post 24 or keyboard shelf 16, and spring 126 again holds friction plates 118 substantially immobile, holding second post 24 substantially immobile.

Preferably, the maximum angle between second post 24 and base 22 is about 90 degrees, and the minimum angle between second post 24 and base 22 is about 48 degrees.

FIGS. 3A–3D show schematic side views of the stand of FIG. 1, showing some of the various adjustments which can be made to the stand by using the adjustment mechanisms shown in FIGS. 2A–2G. In FIG. 3A, first post 20 and second post 24 are shown at relatively short lengths, such that the vertical position of monitor shelf 12 and keyboard shelf 16 is relatively close to base 22. Sleeve 28 has slid over rod 26, such that substantially the majority of rod 26 is within sleeve 28. Similarly, substantially the majority of rod 36 is within sleeve 38. Second post 24 has been pivoted towards first post 20 so that a horizontal distance 130 between monitor shelf 12 and keyboard shelf 16 has been reduced, and so that an angle 132 between second post 24 and base 22 is relatively large.

In FIG. 3B, the length of first post 20 has been increased, by sliding rod 26 out from sleeve 28, such that a portion of rod 26 is no longer within sleeve 28. Similarly, the length of second post 24 has been increased, by sliding rod 36 out from sleeve 38, such that a portion of rod 36 is no longer within sleeve 38.

In FIG. 3C, second post 24 has been pivoted forward, such that angle 132 has been reduced, and such that horizontal distance 130 has been increased.

In FIG. 3D, keyboard shelf 16 has been tilted about second post 24, such that a second angle 134 between keyboard shelf 16 and second post 24 has been reduced.

Figure 4A:
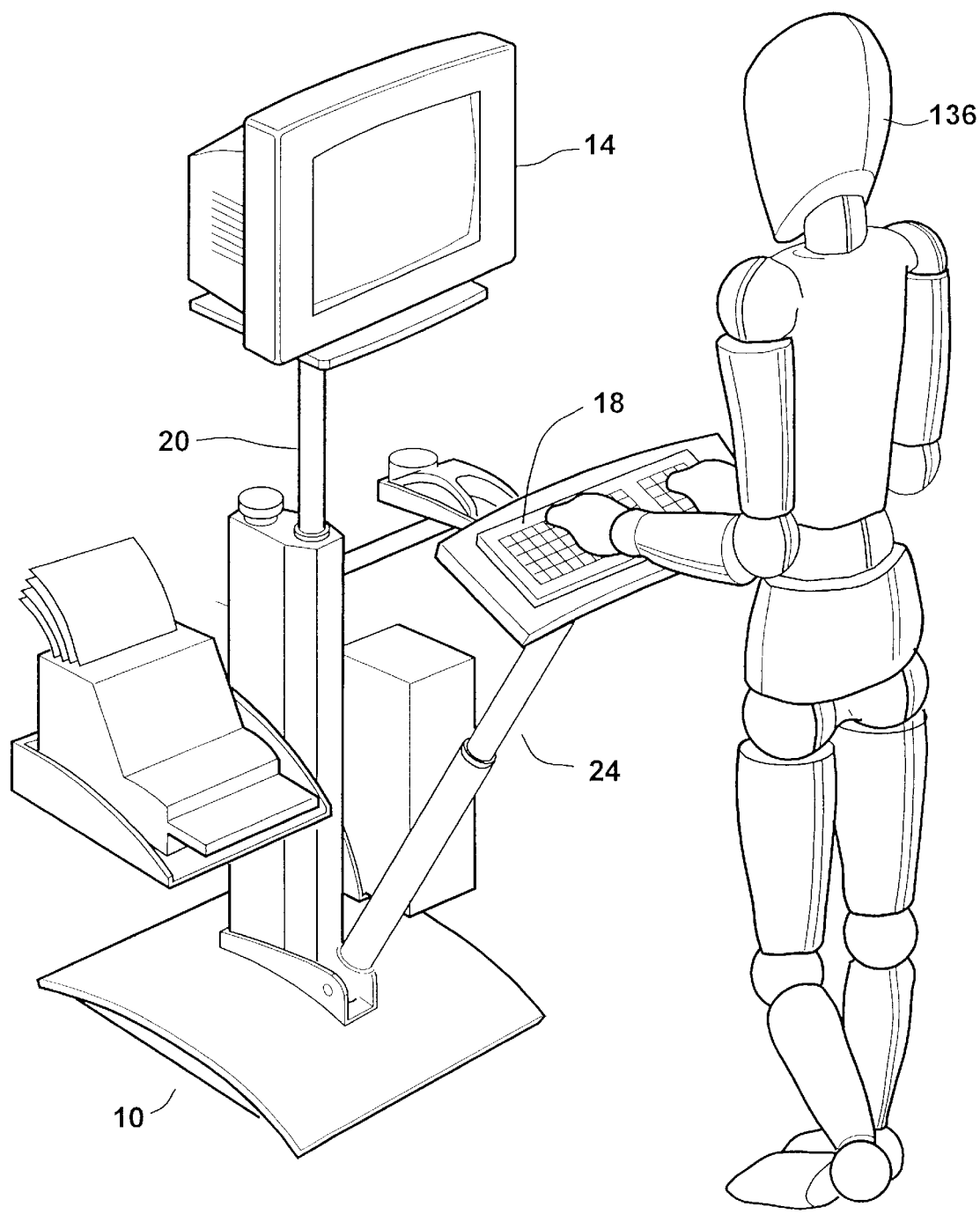
FIGS. 4A–4C illustrate three of the positions which the operator can adopt while using the stand of FIG. 1.
Figure 4B:
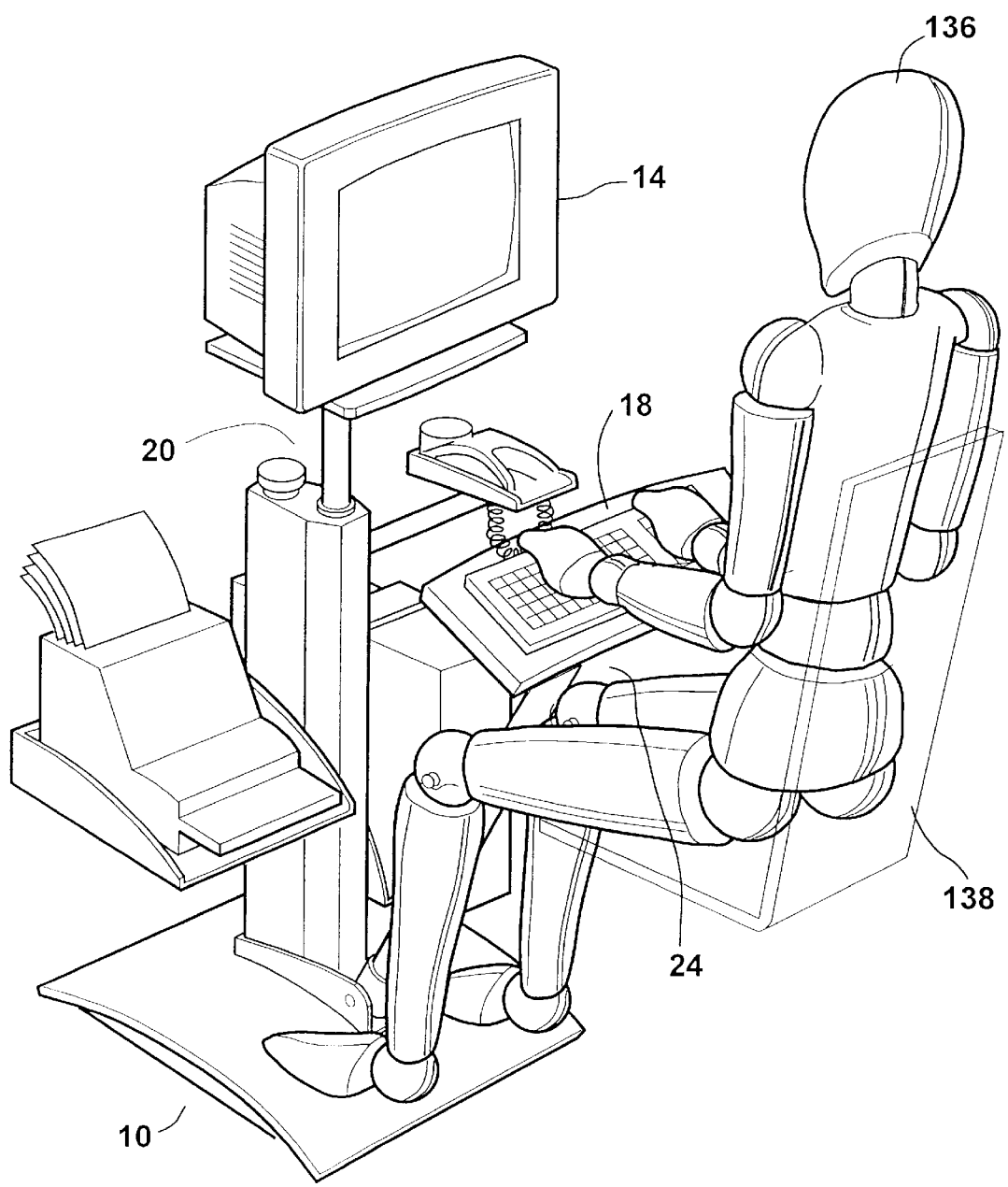
Figure 4C:
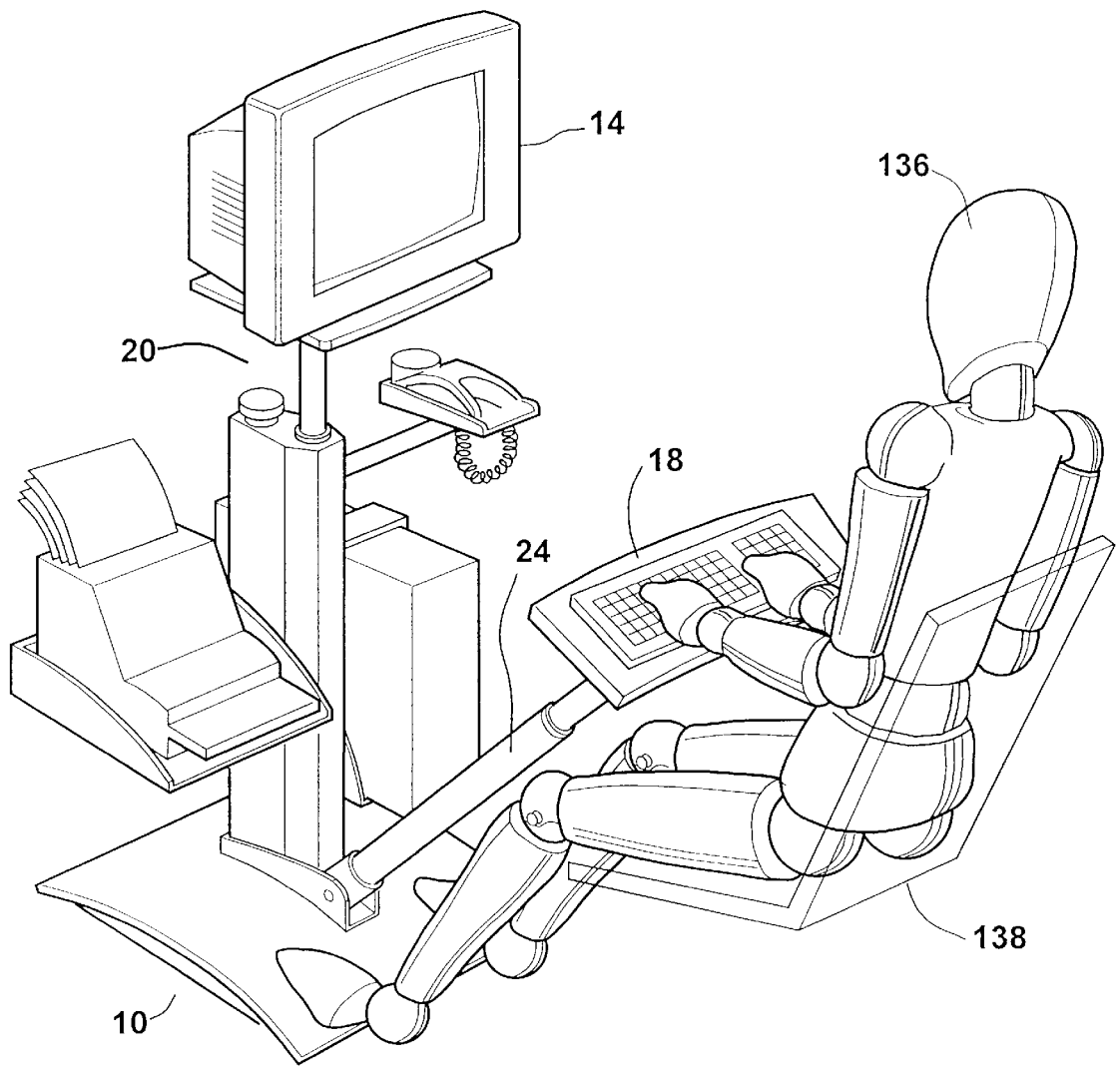

FIGS. 4A–4C illustrate three of the positions which the operator can adopt while using the stand of FIG. 1, due to the adjustability of the stand. In FIG. 4A, the length of first post 20 and second post 24 has been increased to enable an operator 136 to type on keyboard 18 and view monitor 14 while standing up. In FIG. 4B, operator 136 is sitting in a conventional chair 138. Post 20 and post 24 have been adjusted so that operator 136 may type on keyboard 18 and view monitor 14 while sitting in chair 138. Finally, in FIG. 4C, chair 138 has been adjusted so that operator 136 is now leaning back. Again, first post 20 and second post 24 have been adjusted so that operator 136 may type on keyboard 18 and view monitor 14 while leaning back in chair 138.

In the preferred embodiment shown in FIGS. 1A and 1B, stand 10 includes a plurality of auxiliary shelves attached to cover 30. Preferably, a first auxiliary shelf 140 is attached to cover 30 by a first substantially horizontally oriented arm 142. First arm 142 is preferably about 730 mm in length. First auxiliary shelf 140 can be used to hold a telephone, for example.

Figure 5:
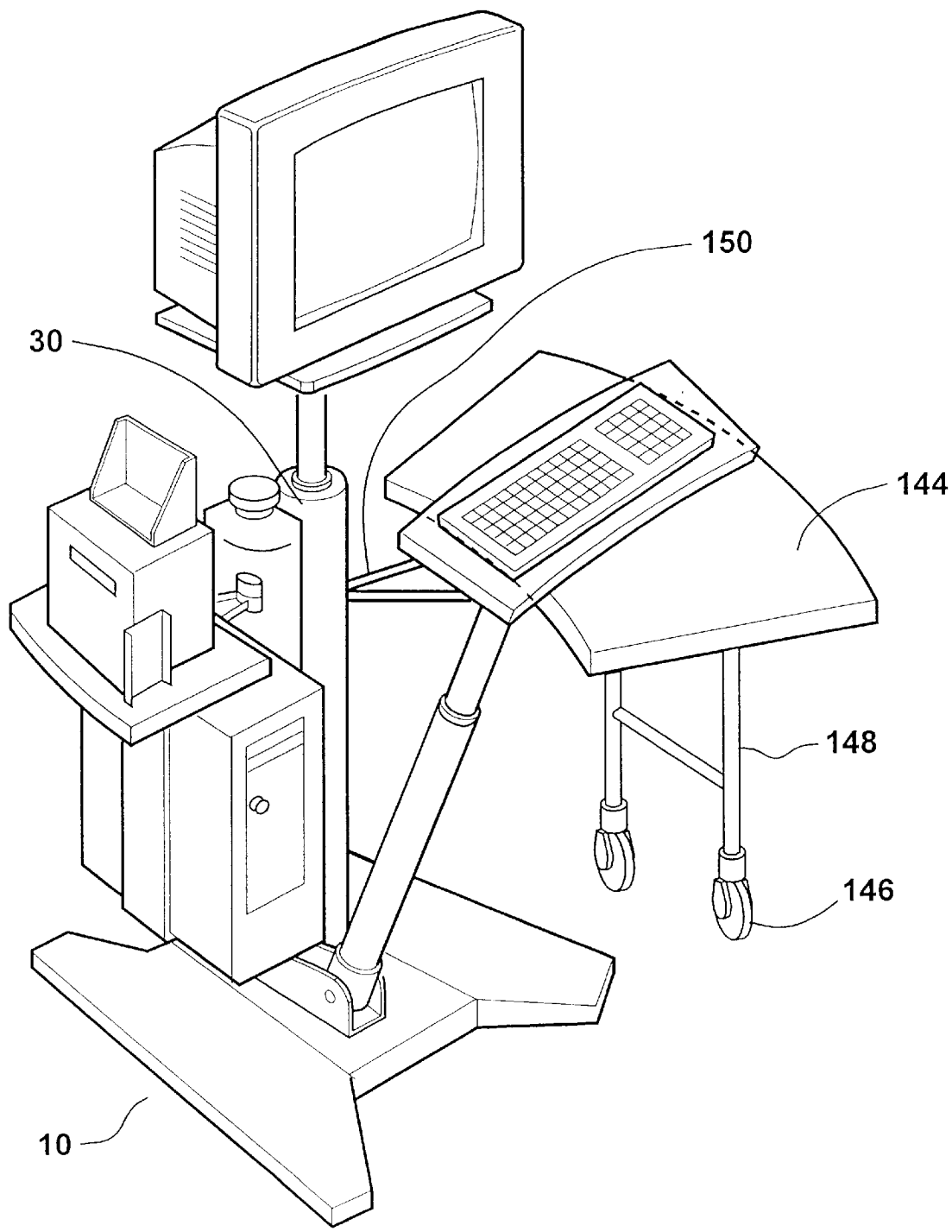
FIG. 5 illustrates a preferred embodiment of the stand of FIGS. 1A and 1B.

Preferably, second auxiliary shelf 144 has two wheels 146 attached by a substantially vertically oriented carriage 148, as shown in FIG. 5. A second substantially horizontally oriented arm 150 is attached at one end to carriage 148, and at the other end to cover 30. Second arm 150 is pivotable about cover 30, and carriage 148 is pivotable about second arm 150 (see also FIGS. 6A–6E). Wheels 146 rolling support second auxiliary shelf 144 as second arm 150 pivots about cover 30. Carriage 148 is preferably extensible, preferably with a maximum length of about 900 mm and a minimum length of about 660 mm. Preferably, second arm 150 is pivotable by about 180 degrees about cover 30.

Preferably, third auxiliary shelf 152 is directly attached to cover 30, and third auxiliary shelf 152 is adapted to hold a printer 154. Optionally, a fourth auxiliary shelf 156 may hold a CPU 158. Fourth auxiliary shelf 156 is also directly attached to cover 30.

Figure 6A:
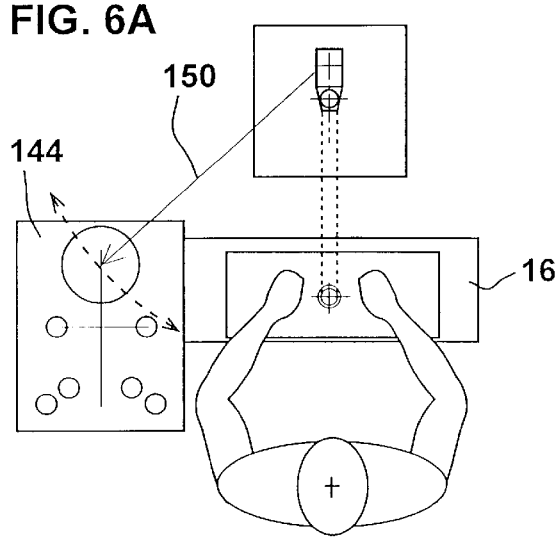
FIGS. 6A–6E illustrate five of the positions of a portion of a preferred embodiment of the stand of FIG. 5.
Figure 6B:
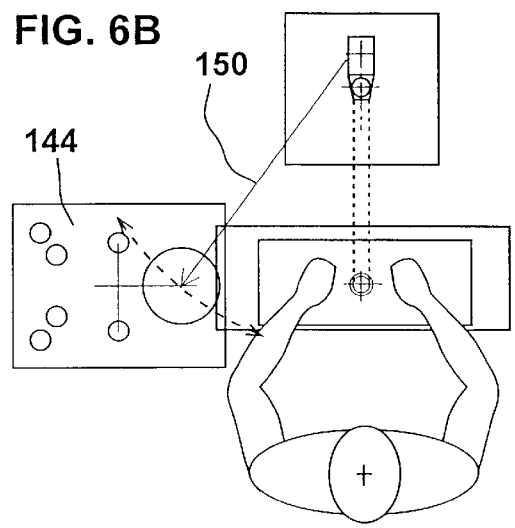
Figure 6C:
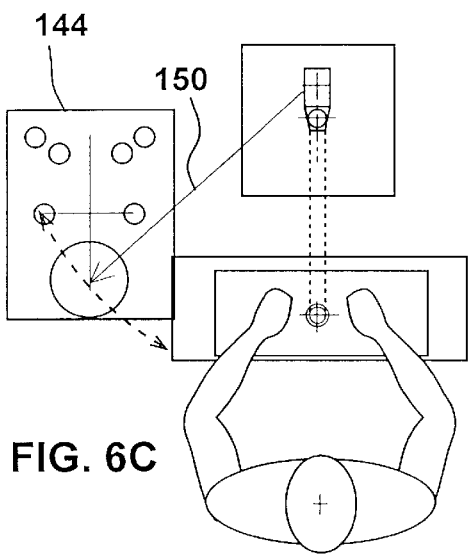
Figure 6D:
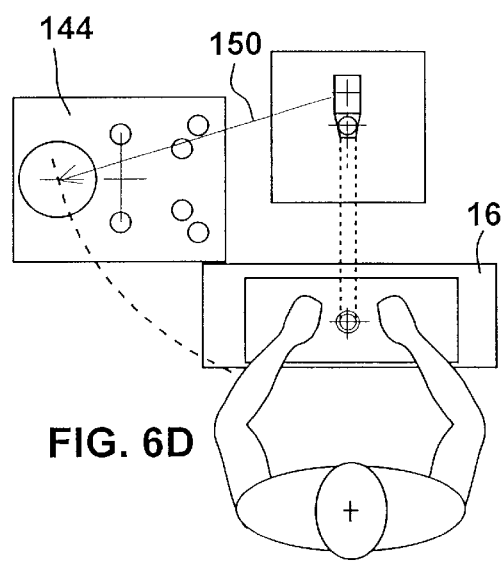
Figure 6E:
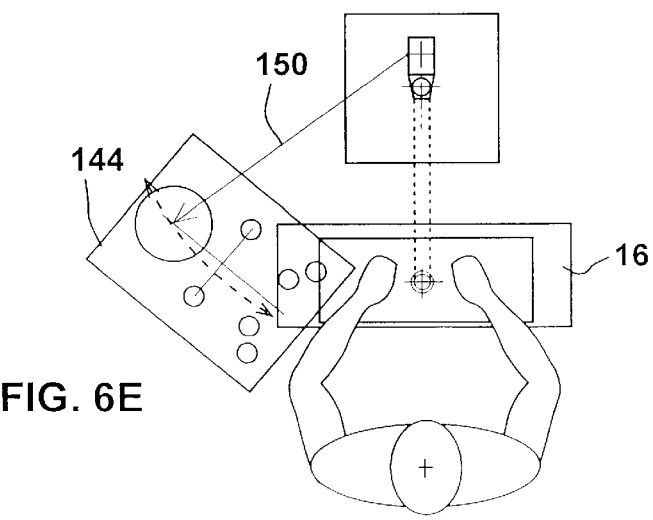

FIGS. 6A–6E illustrate five of the positions of second auxiliary shelf 144 and second arm 150. In FIG. 6A, second auxiliary shelf 144 is shown resting substantially adjacent to keyboard shelf 16. In FIG. 6B, carriage 148 (not shown), and by extension second auxiliary shelf 144, has been pivoted by about 90 degrees about second arm 150. In FIG. 6C, carriage 148 (not shown), and by extension second auxiliary shelf 144, has again been pivoted by about 90 degrees about second arm 150. In FIG. 6D, second arm 150 has been pivoted about cover 30, such that the angle between second arm 150 and keyboard shelf 16 has been increased. Carriage 148 (not shown), and by extension second auxiliary shelf 144, has again be en pivoted by about 90 degrees about second arm 150. Finally, in FIG. 6E, carriage 148 (not shown), and by extension second auxiliary shelf 144, has been pivoted about second arm 150, so that second auxiliary shelf 144 is partially overlapping keyboard shelf 16.

While the invention has been described with respect to a limited number of embodiments, it will be appreciated that many variations, modifications and other applications of the invention may be made.

What is claimed is:

1. A stand for a monitor and a keyboard, comprising:
   (a) a substantially planar base;
   (b) a first substantially vertically oriented post, said first post being extensible, and said first post being attached directly to said base at a first portion of said base;
   (c) a first shelf for holding the monitor, said first shelf being attached to said first post;
   (d) a second post, said second post being extensible, said second post being directly pivotably attached to said base at a second portion of said base, said first portion and said second portion being spaced about said base, and said second post being pivotable about said base, such that said post pivots about said base within a vertical range of from about 45 degrees to about 90 degrees from said base; and
   (e) a second shelf for holding the keyboard, said second shelf being attached to said second post and said second shelf being tiltable about said second post.

2. The stand of claim 1, further comprising
   (a) a first substantially horizontally oriented arm, said first arm being attached to said first post; and
   (b) a first auxiliary shelf attached to said arm.

3. The stand of claim 1, further comprising a third auxiliary shelf attached to said first post.

4. The stand of claim 1, wherein said first post further includes a rod and a sleeve dimensioned to receive said rod, said sleeve being slidable over said rod, such that said first post is extensible.

5. The stand of claim 1, wherein said second post further includes a rod and a sleeve dimensioned to receive said rod, said rod being slidable within said sleeve, such that said second post is extensible.

6. A counterbalance assembly for supporting a post, said counterbalance assembly including:
   (a) at least one spring;
   (b) a first spring bracket for holding one end of said spring;
   (c) a second spring bracket for holding the other end of said spring;
   (d) a first cable for transferring a force exerted by said spring to said post, said first cable being attached at one end to said post;
   (e) a first pulley and a second pulley for engaging said first cable, said first pulley being attached to said first spring bracket;
   (f) a second cable for modulating said force exerted by said spring, said second cable being attached at one end to said second pulley; and
   (g) a third pulley and a fourth pulley for engaging said second cable, said third pulley being attached to said second spring bracket, and said fourth pulley being attached to said second pulley, said fourth pulley having an alterable radius, and said radius of said fourth pulley being determined by said force exerted by said spring.

7. An axial adjustment device for supporting a rod within a sleeve, said axial adjustment device including:
   (a) an abutment member for holding said rod substantially immobile within said sleeve when said abutment member abuts substantially opposing sides of an inner surface of said sleeve;
   (b) a spring assembly for supporting said abutment member, including:
      (i) a spring casing attached to said rod; and
      (ii) a spring attached at one end to said abutment member, and at another end to said spring casing, such that when said spring is relaxed, said abutment member abuts said inner surface, and when said spring is compressed, said rod is slidable within said sleeve;
   (c) a first piston being attached to said spring assembly;
   (d) a tube for delivering oil to said first piston;
   (e) a second piston for delivering said oil to said tube; and
   (f) a lever for compressing said second piston, such that when said lever is moved, said rod is slidable within said sleeve, and such that when said lever is released, said rod is held substantially immobile within said sleeve.

8. A stand for a monitor and a keyboard, comprising:
   (a) a base;
   (b) a first substantially vertically oriented post, said first post being extensible, and said first post being attached directly to said base, said first post further featuring:
      (i) a rod
      (ii) a sleeve dimensioned to receive said rod, said sleeve being slidable over said rod, such that said first post is extensible and comprising a counterbalance assembly for supporting said sleeve, said counterbalance assembly including:
         a. at least one spring;
         b. a first spring bracket for holding one end of said spring, said first spring bracket being attached substantially near the top of said sleeve;
         c. a second spring bracket for holding the other end of
         d. a first cable for transferring a force exerted by said spring to said sleeve and for pulling said sleeve, said first cable being attached at one end to said sleeve;
         e. a first pulley and a second pulley for engaging said first cable, said first pulley being attached to said first spring bracket, and said second pulley being attached substantially near the bottom of said first post;

f. a second cable for modulating said force exerted by said spring, said second cable being attached at one end to said second pulley;

g. a third pulley and a fourth pulley for engaging said second cable, said third pulley being attached to said second spring bracket, and said fourth pulley being attached to said second pulley, said fourth pulley having an alterable radius, said radius of said fourth pulley being determined by said force exerted by said spring; and h. a handle for adjusting said force exerted by said spring, said handle being attached to said first spring bracket;

(c) a first shelf for holding the monitor, said first shelf being attached to said first post;

(d) a second post, said second post being extensible, said second post being attached directly to said base and said second post being pivotable about said base, such that said post pivots about said base within a vertical range of about 45 degrees to about 90 degrees; and (e) a second shelf for holding the keyboard, said second shelf being attached to said second post and said second shelf being tiltable about said second post.

9. The stand of claim 8, wherein said spring is two springs.

10. The stand of claim 8, wherein said first post further includes a tightner assembly for holding said sleeve substantially immobile, said tightener assembly including:

(a) a casing attached to said first post;

(b) a shaft located substantially within said casing for holding said sleeve substantially immobile;

(c) a spring for exerting a force against said shaft and holding said shaft against said sleeve; and (d) a knob for adjusting said spring.

11. The stand of claim 8, wherein said spring is a leaf spring.

12. A stand for a monitor and a keyboard, comprising:

(a) a base;

(b) a first substantially vertically oriented post, said first post being extensible, and said first post being attached to said base;

(c) a first shelf for holding the monitor, said first shelf being attached to said first post;

(d) a second post, said second post being extensible, said second post being attached to said base, said second post being pivotable about said base, said second post further features (i) a rod;

(ii) a sleeve dimensioned to receive said rod, said rod being slidable within said sleeve, such that said second post is extensible; and (iii) an axial adjustment device, said axial adjustment device including:

a. an annular ring for holding said rod substantially immobile within said sleeve when said ring abuts substantially opposing sides of an inner surface of said sleeve;

b. two wedges for holding said annular ring against said inner surface;

c. a spring assembly for supporting said rod, including:

i. a spring casing attached to said rod; and ii. a spring attached at one end to said wedges, and at another end to said spring casing, such that when said spring is relaxed, said annular ring abuts said inner surface, and when said spring is compressed, said rod is slidable within said sleeve;

d. a cylinder for compressing said spring when said cylinder is in a first axial position, and for relaxing said spring when said cylinder is in a second axial position, said cylinder being attached to said wedges;

e. a first piston being attached to said cylinder, said first piston determining said axial position of said cylinder;

f. a tube for delivering oil to said first piston, such that said first piston moves down and pushes said cylinder from said second axial position to said first axial position, one end of said tube being attached to said first piston;

g. a second piston for delivering said oil to said tube, another end of said tube being attached to said second piston; and h. a lever for compressing said second piston, such that when said lever is moved, said rod is slidable within said sleeve, and such that when said lever is released, said rod is held substantially immobile within said sleeve; and (e) a second shelf for holding the keyboard, said second shelf being attached to said second post and said second shelf being tiltable about said second post.

13. The stand of claim 12, wherein said second post further includes a universal joint for tilting said keyboard shelf about said second post, said universal joint including:

(a) a sphere for rotating;

(b) a sphere clamp for attaching said sphere to said keyboard shelf;

(c) a lower ring for holding substantially the lower portion of said sphere;

(d) an upper ring for holding substantially the upper portion of said sphere;

(e) a spring assembly for propelling said lower ring towards said upper ring; and (e) a hollow rod being attached at one end to said spring assembly and at another end to said first piston, such that when said first piston moves down, said hollow rod pulls said spring assembly down and said lower ring moves away from said upper ring, such that said sphere is rotatable.

14. The stand of claim 12, wherein said spring assembly includes a leaf spring.

* * * * *